United States Patent
Liu et al.

(10) Patent No.: US 11,895,006 B2
(45) Date of Patent: Feb. 6, 2024

(54) COMMUNICATION METHOD, DEVICE, AND SYSTEM

(71) Applicant: Huawei Technologies Co., Ltd., Shenzhen (CN)

(72) Inventors: Bingshe Liu, Beijing (CN); Chongyang Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 376 days.

(21) Appl. No.: 17/200,193

(22) Filed: Mar. 12, 2021

(65) Prior Publication Data
US 2021/0203586 A1    Jul. 1, 2021

Related U.S. Application Data

(63) Continuation of application No. PCT/CN2019/101674, filed on Aug. 21, 2019.

(30) Foreign Application Priority Data

Sep. 15, 2018 (CN) .......................... 201811077544.2

(51) Int. Cl.
*H04L 45/02* (2022.01)
*H04L 12/46* (2006.01)
(Continued)

(52) U.S. Cl.
CPC .......... *H04L 45/04* (2013.01); *H04L 12/4641* (2013.01); *H04L 45/02* (2013.01);
(Continued)

(58) Field of Classification Search
None
See application file for complete search history.

(56) References Cited

U.S. PATENT DOCUMENTS

2004/0213228 A1* 10/2004 Tingle ................. H04L 12/4633
370/389
2016/0182290 A1    6/2016 Elias et al.
(Continued)

FOREIGN PATENT DOCUMENTS

| CN | 101286922 A | 10/2008 |
|----|-------------|---------|
| CN | 101924676 A | 12/2010 |

(Continued)

OTHER PUBLICATIONS

Wang, H., "EVPN ELAN use of Control Words," draft-wang-bess-evpn-controlword-00, BESS Working Group, Oct. 22, 2018, 5 pages.
(Continued)

*Primary Examiner* — Xavier S Wong
(74) *Attorney, Agent, or Firm* — Conley Rose, P.C.

(57) ABSTRACT

According to a communication method, a local device and a peer device notify each other through a border gateway protocol (BGP) message whether the local device and the peer device have a control word processing capability. When the peer device also has a control word processing capability, the peer device uses a service packet to carry a control word. When the local device has no control word processing capability, no control word is carried when the peer device sends a service packet to the local device.

14 Claims, 8 Drawing Sheets

(51) Int. Cl.
*H04L 45/00* (2022.01)
*H04L 45/50* (2022.01)
*H04L 45/745* (2022.01)

(52) U.S. Cl.
CPC .............. *H04L 45/20* (2013.01); *H04L 45/50* (2013.01); *H04L 45/745* (2013.01)

(56) References Cited

U.S. PATENT DOCUMENTS

| | | | |
|---|---|---|---|
| 2016/0285761 A1* | 9/2016 | Dong | ................... H04L 12/4666 |
| 2019/0097928 A1* | 3/2019 | Chunduri | .............. H04L 45/036 |
| 2021/0085688 A1 | 3/2021 | Gray et al. | |

FOREIGN PATENT DOCUMENTS

| | | |
|---|---|---|
| CN | 102223278 A | 10/2011 |
| CN | 102843282 A | 12/2012 |
| CN | 105429841 A | 3/2016 |
| CN | 105450493 A | 3/2016 |
| CN | 106059913 A | 10/2016 |
| JP | 2021514011 A | 6/2021 |
| WO | 2009012688 A1 | 1/2009 |

OTHER PUBLICATIONS

Martini, L., Ed., et al., "Pseudowire Setup and Maintenance Using the Label Distribution Protocol (LDP)," RFC 8077, Feb. 2017, 17 pages.
Li, J., et al., "Design, Implementation and Performance Evaluation of MPLS Layer 2 Martini VPN," Ottawa, Ontario, Sep. 2004, 142 pages.
Decraene, B., et al., "BGP Next-Hop dependent capabilities," draft-ietf-id r-next-hop-capability-03, Jun. 26, 2018, 12 pages.
RFC 2858, Bates, T., et al., "Multiprotocol Extensions for BGP-4," Jun. 2000, 11 pages.
RFC 4271, Y. Rekhter, Y., Ed et al., "A Border Gateway Protocol 4 (BGP-4)," Jan. 2006, 104 pages.
RFC 4448, Martini, L., Ed et al., "Encapsulation Methods for Transport of Ethernet over MPLS Networks," Apr. 2006, 24 pages.
RFC 4760, Bates, T., et al., "Multiprotocol Extensions for BGP-4," Jan. 2007, 12 pages.
RFC 7432, Sajassi, A., Ed et al., BGP MPLS-Based Ethernet VPN, Internet Engineering Task Force (IETF), Feb. 2015, 56 pages.

* cited by examiner

| 0 | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Type (Type) | | | | | | | | Length (Length) | | | | | | | | Reserved (Reserved) | | | | | | | | | | | | | | | |
| Value (Value, used to carry control word indication information) | | | | | | | | | | | | | | | | | | | | | | | | | | | | | | | |

FIG. 3

COMMUNICATION METHOD, DEVICE, AND SYSTEM

CROSS-REFERENCE TO RELATED APPLICATIONS

This application a continuation of International Patent Application No. PCT/CN2019/101674 filed on Aug. 21, 2019, which claims priority to Chinese Patent Application No. 201811077544.2 filed on Sep. 15, 2018. The disclosures of the aforementioned applications are hereby incorporated by reference in their entireties.

TECHNICAL FIELD

This application relates to the communications field, and in particular, to a communication method, an apparatus, and a system in an Ethernet virtual private network (EVPN).

BACKGROUND

An EVPN is a virtual private network (VPN) that provides layer 2 network interworking in a multiprotocol label switching (MPLS) network. Currently, an EVPN technology is widely used in network designs of operators as a mainstream solution for carrying layer 2 VPN services.

To avoid packet disorder that may be caused because a same EVPN service flow is distributed by a provider (P) device to different forwarding paths, a provider edge (PE) device adds a 4-byte control word to each to-be-sent EVPN service packet. A value of each of the first 4 bits of the control word is 0. In this way, after receiving the EVPN service packet carrying the control word, the P device distributes all packets belonging to a same service flow to a same forwarding path, so as to effectively avoid packet disorder.

However, in other approaches, when a device that supports a control word processing capability and a device that supports no control word processing capability or a device that supports a control word processing capability but does not enable the control word processing capability coexist in the EVPN, devices possibly cannot normally communicate with each other. For example, when a PE 1 enables a control word processing capability, but a Border Gateway Protocol (BGP) neighbor PE 2 of the PE 1 supports or enables no control word processing capability, the PE 1 forwards, to the PE 2, a data packet carrying a control word. Because the PE 2 supports or enables no control word processing capability, the PE 2 cannot correctly parse the received data packet. For another example, when a PE 2 supports or enables no control word processing capability, but a PE 1 enables a control word processing capability, the PE 2 sends, to the PE 1, a data packet carrying no control word. After receiving the data packet, the PE 1 parses the data packet by including a control word in the data packet. Consequently, the PE 1 cannot correctly parse the data packet. In conclusion, in an EVPN in which a device that supports a control word processing capability and a device that supports no control word processing capability or a device on which no control word processing capability is deployed coexist, how to ensure normal sending and receiving of traffic between network devices is a technical problem that needs to be resolved currently.

SUMMARY

In view of this, this application provides a communication method and a network device, to ensure normal communication between network devices and improve service transmission reliability in an EVPN in which a device that supports a control word processing capability and a device that supports no control word processing capability or a device on which no control word processing capability is deployed coexist.

According to a first aspect, this application provides a communication method, including generating, by a first network device, a first EVPN service packet, where the first EVPN service packet includes control word indication information and a control word, and the control word indication information is used to indicate that the first EVPN service packet includes the control word, and sending, by the first network device, the first EVPN service packet to a second network device.

In this application, when forwarding the service packet to the second network device through a forwarding plane, the first network device uses the service packet to carry the control word indication information, so that when receiving the service packet, the second network device can determine, based on the control word indication information carried in the packet, that the packet carries the control word, and then parse the packet based on a correct packet format. This effectively ensures normal service communication.

In a possible design, before the generating, by a first network device, a first EVPN service packet, the method further includes receiving, by the first network device, a first BGP message sent by the second network device, where the first BGP message includes the control word indication information.

In a possible design, the generating, by a first network device, a first EVPN service packet includes generating, by the first network device, the first EVPN service packet based on the first BGP message.

In a possible design, the first BGP message further includes EVPN routing information, and the generating, by the first network device, the first EVPN service packet based on the first BGP message includes generating, by the first network device based on the EVPN routing information and the control word indication information, a forwarding entry including the control word indication information, and generating, by the first network device, the first EVPN service packet based on the forwarding entry. In this application, when the second network device advertises an EVPN route to the first network device, the control word indication information is also carried, so that after receiving the BGP message, the first network device locally stores the EVPN routing information and the control word indication information, and generates the forwarding entry to guide subsequent packet forwarding. This operation is simple, and there is no need to use separate signaling to send the control word indication information, so that network overheads are reduced.

In a possible design, the method further includes receiving, by the first network device, a second BGP message sent by a third network device, and determining, by the first network device based on the second BGP message, that the third network device has no control word processing capability.

In a possible design, the method further includes generating, by the first network device, a second EVPN service packet based on a fact that the first network device determines that the third network device has no control word processing capability, where the second EVPN service packet carries no control word, and sending, by the first network device, the second EVPN service packet to the third network device.

According to a second aspect, this application provides a communication method, including receiving, by a second network device, a first EVPN service packet sent by a first network device, where the first EVPN service packet includes control word indication information and a control word, determining, by the second network device based on the control word indication information, that the first EVPN service packet includes the control word, obtaining, by the second network device, a processed EVPN service packet based on the first EVPN service packet, where the processed EVPN service packet does not carry the control word indication information or the control word, and sending, by the second network device, the processed EVPN service packet to a destination of the first EVPN service packet.

In a possible design, before the receiving, by a second network device, the first EVPN service packet, the method further includes sending, by the second network device, a first BGP message to the first network device, where the first BGP message includes the control word indication information, and the control word indication information is used to indicate the first network device to use the first EVPN service packet to carry the control word when the first network device sends the first EVPN service packet to the second network device.

In a possible design, the control word indication information is carried in an extended community attribute in the first BGP message.

According to a third aspect, this application provides a communication method, including receiving, by a first network device, a first BGP message sent by a second network device, where the first BGP message includes EVPN routing information and control word indication information, and the control word indication information is used to indicate the first network device to use a first EVPN service packet to carry a control word when the first network device sends the first EVPN service packet to the second network device, and generating, by the first network device based on the EVPN routing information and the control word indication information, a forwarding entry including the control word indication information.

In this application, on a control plane, the second network device sends the control word indication information to the first network device through the BGP message, to advertise a control word processing capability of the second network device, so that the first network device can determine, with reference to a control word processing capability of the first network device, whether the control word needs to be carried when the first network device sends the service packet to the second network device. Therefore, when the second network device receives the service packet sent by the first network device, if the packet carries the control word indication information advertised by the second network device to the first network device through the BGP message, the second network device determines that the packet carries the control word. If the packet does not carry the control word indication information, the second network device parses the received service packet based on a format of a packet carrying no control word. In this way, normal communication between a network device having a control word processing capability and a network device having no control word processing capability can be ensured, and service transmission reliability is effectively improved.

In a possible design, the method further includes generating, by the first network device, the first EVPN service packet based on the forwarding entry, where the first EVPN service packet includes the control word indication information and the control word, and sending, by the first network device, the first EVPN service packet to the second network device.

In a possible design, the method further includes receiving, by the first network device, a second BGP message sent by a third network device, and determining, by the first network device based on the second BGP message, that the third network device has no control word processing capability.

In a possible design, the method further includes generating, by the first network device based on the fact that the first network device determines that the third network device has no control word processing capability, a second EVPN service packet including no control word, and sending, by the first network device, the second EVPN service packet to the third network device.

According to a fourth aspect, this application provides a communication method, including generating, by a second network device, a BGP message, where the BGP message includes the control word indication information, and the control word indication information is used to indicate a first network device to use an EVPN service packet to carry a control word when the first network device sends the EVPN service packet to the second network device, and sending, by the second network device, the BGP message to the first network device.

In a possible design, the method further includes receiving, by the second network device, the EVPN service packet sent by the first network device, where the EVPN service packet includes the control word indication information and the control word, determining, by the second network device based on the control word indication information, that the EVPN service packet includes the control word, obtaining, by the second network device, a processed EVPN service packet based on the EVPN service packet, where the processed EVPN service packet does not carry the control word indication information or the control word, and sending, by the second network device, the processed EVPN service packet to a destination of the EVPN service packet.

In a possible design, the control word indication information is carried in a next-hop capabilities attribute next-hop capabilities attribute or an extended community attribute in the BGP message.

According to a fifth aspect, this application provides a first network device. The first network device includes a memory and a processor connected to the memory. The processor is configured to execute a computer-readable instruction in the memory, to perform the method in any one of the first aspect or the possible designs of the first aspect, or perform the method in any one of the third aspect or the possible designs of the third aspect.

According to a sixth aspect, this application provides a second network device. The second network device includes a memory and a processor connected to the memory. The processor is configured to execute a computer-readable instruction in the memory, to perform the method in any one of the second aspect or the possible designs of the second aspect, or perform the method in any one of the fourth aspect or the possible designs of the fourth aspect.

According to a seventh aspect, an embodiment of this application provides a communications system, including the first network device provided in the fifth aspect and the second network device provided in the sixth aspect, and configured to perform the method in any one of the first aspect, the second aspect, the third aspect, the fourth aspect, the possible designs of the first aspect, the possible designs of the second aspect, the possible designs of the third aspect, or the possible designs of the fourth aspect.

According to an eighth aspect, an embodiment of this application provides a computer-readable storage medium. The computer-readable storage medium stores an instruction, and when the instruction is run on a computer, the computer is enabled to perform the method in any one of the first aspect, the second aspect, the third aspect, the fourth aspect, the possible designs of the first aspect, the possible designs of the second aspect, the possible designs of the third aspect, or the possible designs of the fourth aspect.

In this application, a local device dynamically advertises a control word processing capability of the local device to a remote device, to simplify operations, so that in an EVPN, a network device that supports or enables no control word processing capability can be compatible with. Specifically, a BGP control word extended community attribute is newly added to advertise the control word processing capability of the local end to the peer device. If the remote device has a control word processing capability, in other words, the control word processing capability is deployed on the remote device and the remote device enables the control word processing capability, when sending a data packet to the local device, the remote device uses the data packet to carry a control word and control word indication information that is advertised by the local device in advance. In this way, the local device can correctly identify, based on the control word indication information, that the data packet carries the control word, and can correctly parse the data packet based on a format of a packet carrying a control word. If no control word processing capability is deployed on the remote device or the remote device enables no control word processing capability, neither a control word nor control word indication information is carried when the remote device sends a data packet to the local device. In this way, the local device determines, based on the fact that the data packet does not carry control word indication information advertised to the peer device in advance, that the received data packet carries no control word, and then parses the data packet based on a format of a packet carrying no control word. This can also ensure that the packet is correctly parsed.

BRIEF DESCRIPTION OF DRAWINGS

FIG. 3 is a schematic diagram of a format of a BGP attribute according to an embodiment of this application.

DESCRIPTION OF EMBODIMENTS

Figure 1:
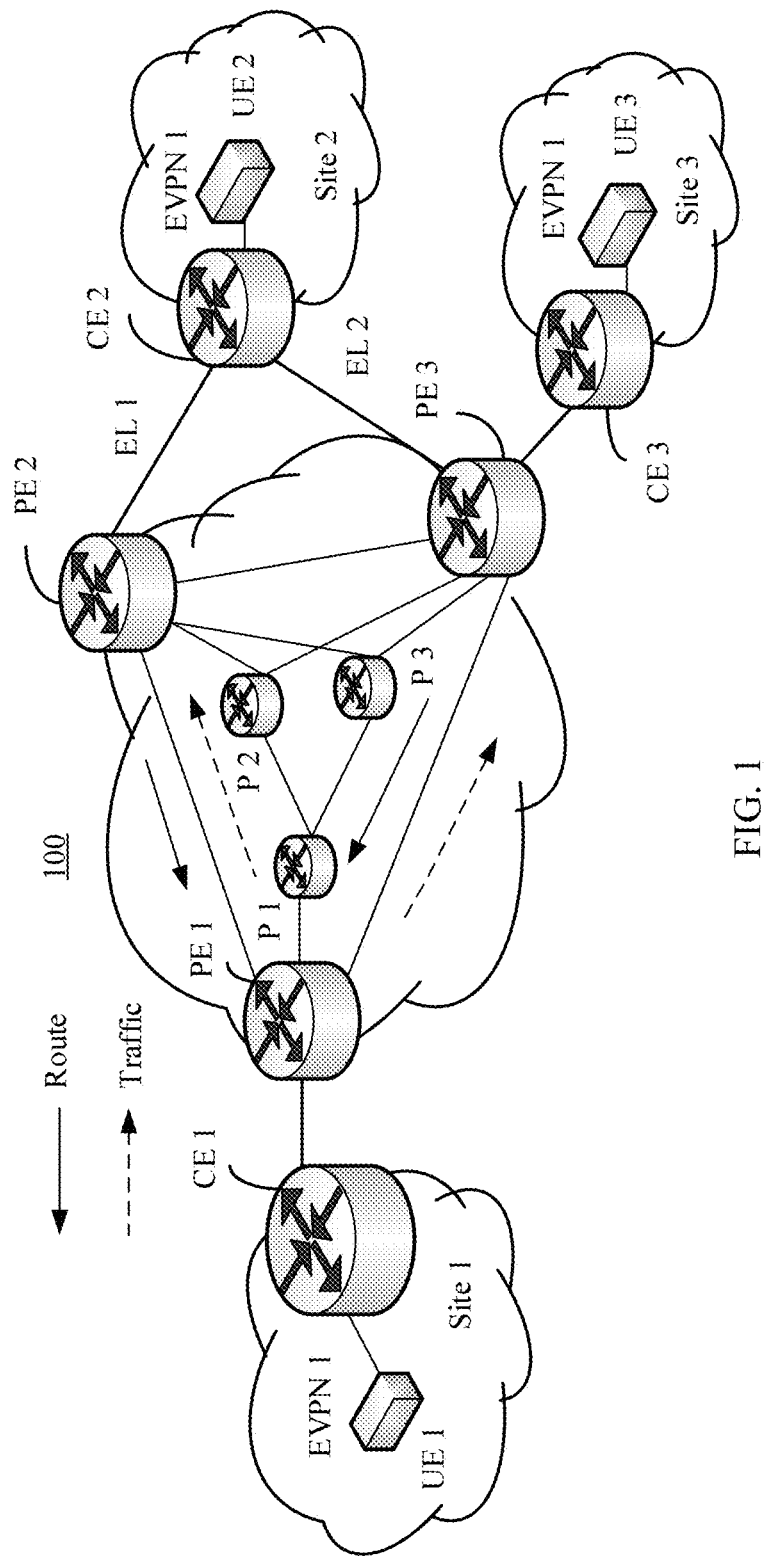
FIG. 1 is a schematic diagram of an EVPN network architecture according to an embodiment of this application.

The following describes technical solutions in the embodiments of this application with reference to accompanying drawings. A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

Ordinal numbers such as "1", "2", "3", "first", "second", and "third" in this application are used to distinguish between a plurality of objects, but are not used to limit a sequence of the plurality of objects.

"A and/or B" mentioned in this application should be understood as including the following cases only A is included, only B is included, or both A and B are included.

For an EVPN technology in this application, refer to a description of the Internet Engineering Task Force (IETF) request for comments (RFC) 7432. The RFC 7432 is incorporated in this application by reference in its entirety.

In this application, an execution body of method steps is referred to as a "local end", and a network element that communicates with the execution body is referred to as a "remote end". These can be understood by a person skilled in the art.

In this application, an "operator network" may also be referred to as a "backbone network provided by a service provider", a "service provider network", or a "public network". The foregoing different terms may be often used interchangeably.

"Having a control word processing capability" in this application means that a network device supports a control word processing capability and enables the control word processing capability. When receiving a data packet that is sent by another network device and that carries a control word, the network device has a capability of correctly identifying the control word carried in the data packet. When sending a data packet to another network device having a control word processing capability, the network device can use the data packet to carry a control word.

"Having no control word processing capability" in this application means that a network device supports no control word processing capability, or even if a network device supports a control word processing capability, the network device does not enable the control word processing capability. When receiving a data packet that is sent by another network device and that carries a control word, the network device has no capability of correctly identifying the control word carried in the data packet. When sending a data packet to another network device, the network device cannot use the data packet to carry a control word.

"Control word indication information" in this application may also be referred to as a control word label identifier (CRI), a control word indication label, or a control word label. On a control plane, the control word indication information is used to indicate, to a BGP peer, that a network device that sends the control word indication information has a control word processing capability. On a forwarding plane, when a transmitted data packet carries the control word indication information, the control word indication information is used to indicate that the transmitted data packet includes a control word. When a transmitted data packet does not carry the control word indication information, a network device receiving the data packet may determine that the data packet carries no control word. When the control word indication information is transmitted in an MPLS EVPN, the control word indication information is encapsulated in an MPLS header as a label, and is used to indicate that an EVPN service packet carries a control word. When a network device receives the control word indication information according to a control plane protocol, the control word indication information is used to indicate the network device receiving the control word indication information to use a data packet to carry a control word when the network device receiving the control word indication information sends the data packet to a network device sending the control word indication information. For example, a local network device has a control word processing capability. When notifying, through a BGP message, a peer network device that the local network device has the control word processing capability, the local network device uses the BGP message to carry control word indication information. The control word indication information is used to indicate the peer device to use a data packet to carry a control word when the peer device sends the data packet to the local device. If the peer device is a network device having a control word processing capability, when the peer device sends the data packet to the local device, the peer device uses the data packet to carry the control word indication information and the control word. After receiving the packet, the local device determines, based on the control word indication information, that the data packet carries the control word. In this way, the local device may parse the data packet based on a format of a packet carrying a control word. If the peer device is a network device having no control word processing capability, the data packet sent by the peer device to the local device carries neither a control word nor control word indication information. In this way, after receiving the data packet, the local device determines, based on the fact that the data packet carries no control word indication information, that the data packet carries no control word.

FIG. 1 is a schematic diagram of an EVPN architecture to which an embodiment of this application is applied. As shown in FIG. 1, a network 100 includes a backbone network and a plurality of EVPN sites provided by a service provider. The network 100 includes three customer edge (CE) devices, three pieces of user equipment (UE), and three PE devices. The network 100 may further include a plurality of P devices, for example, a P 1, a P 2, and a P 3. A P device such as a P router is a backbone router in the backbone network, and is not directly connected to a CE device. The P device has a basic MPLS forwarding capability, maintains a route to a PE, and does not need to learn of routing information of any VPN. As shown in FIG. 1, the three CE devices are a CE 1, a CE 2, and a CE 3. The CE device is an edge device in a user network and has an interface that is directly connected to a PE device. The CE device may be a router or a switch, or may be a host. The CE device cannot "perceive" existence of an EVPN, and does not need to support MPLS. The three PE devices are a PE 1, a PE 2, and a PE 3. The PE device is an edge device in a service provider network, and may be a router or a layer 3 switch. The PE device is directly connected to a CE device of a user, and all processing on the EVPN occurs on the PE. In a mobile bearer network, the CE device may be a base transceiver station (BTS), and the PE device may be a radio network controller (RNC) site gateway (RSG), and may be connected to a base station controller (BSC) or a RNC. After learning of MAC information from a CE, a local PE exchanges EVPN routing information with another PE through BGP. The local PE maintains EVPN routing information advertised by a CE directly connected to the local PE and EVPN routing information advertised by a remote PE. The plurality of EVPN sites include a site 1 to a site 3. The site 1, the site 2, and the site 3 belong to a same EVPN instance (EVI) (e.g., EVPN 1). The PE 1 is connected to the CE 1. The PE 3 is connected to the CE 3. The CE 2 is dual-homed to the PE 2 and the PE 3 through an Ethernet link (EL) 1 and an EL 2. A group of ELs including the two ELs is an Ethernet segment (ES). An ES identifier (ESI) is a unique non-zero identifier, and is used to identify the ES. The PE 1 and the PE 2 are a pair of BGP peers, the PE 1 and the PE 3 are a pair of BGP peers, and the PE 2 and the PE 3 are a pair of BGP peers. In an EVPN scenario, the BGP peer may also be referred to as an EVPN peer. "A pair of BGP peers" may be understood as that one device is a BGP peer of the other device. For example, that the PE 1 and the PE 2 are a pair of BGP peers may be understood as that the PE 1 is a BGP peer of the PE 2, or may be understood as that the PE 2 is a BGP peer of the PE 1. The BGP peer may also be referred to as a BGP neighbor. Correspondingly, the EVPN peer may also be referred to as an EVPN neighbor. In this application, for ease of description, the BGP peer is used in all subsequent embodiments. The BGP peer is established through an OPEN message specified in BGP, and the established BGP peer is maintained through a KEEPALIVE message. For implementations of the OPEN message and the KEEPALIVE message, refer to related descriptions in the IETF RFC 2858 and the IETF RFC 4271. A route reflector (RR) may be deployed between two devices for BGP peer establishment, so as to complete BGP peer establishment through the RR. For example, in a scenario shown in FIG. 1, an RR may be deployed between the PE 1 and the PE 2. The PE 1 sends a BGP message to the PE 2 through the RR to advertise an EVPN route. An autonomous system boundary router (ASBR) may be further deployed between the two devices for BGP peer establishment. For example, in the scenario shown in FIG. 1, the PE 1 and the PE 2 belong to different ASs, the PE 1 and an ASBR 1 are deployed in a first AS, and the PE 2 and an ASBR 2 are deployed in a second AS. The PE 1 sends a BGP message to the PE 2 through the ASBR 1 and the ASBR 2, to advertise an EVPN route.

It should be understood that FIG. 1 shows only an example in which there are three PE devices, three CE devices, three UE devices, three P devices, and three EVPN sites. The network may include any other quantities of PE devices, CE devices, UE devices, P devices, and EVPN sites. This is not limited in the embodiments of this application.

It should be further noted that the PE and the PE device have a same meaning in the embodiments of this application. Likewise, the CE and the CE device have a same meaning, and the UE and the UE device have a same meaning.

Figure 2:
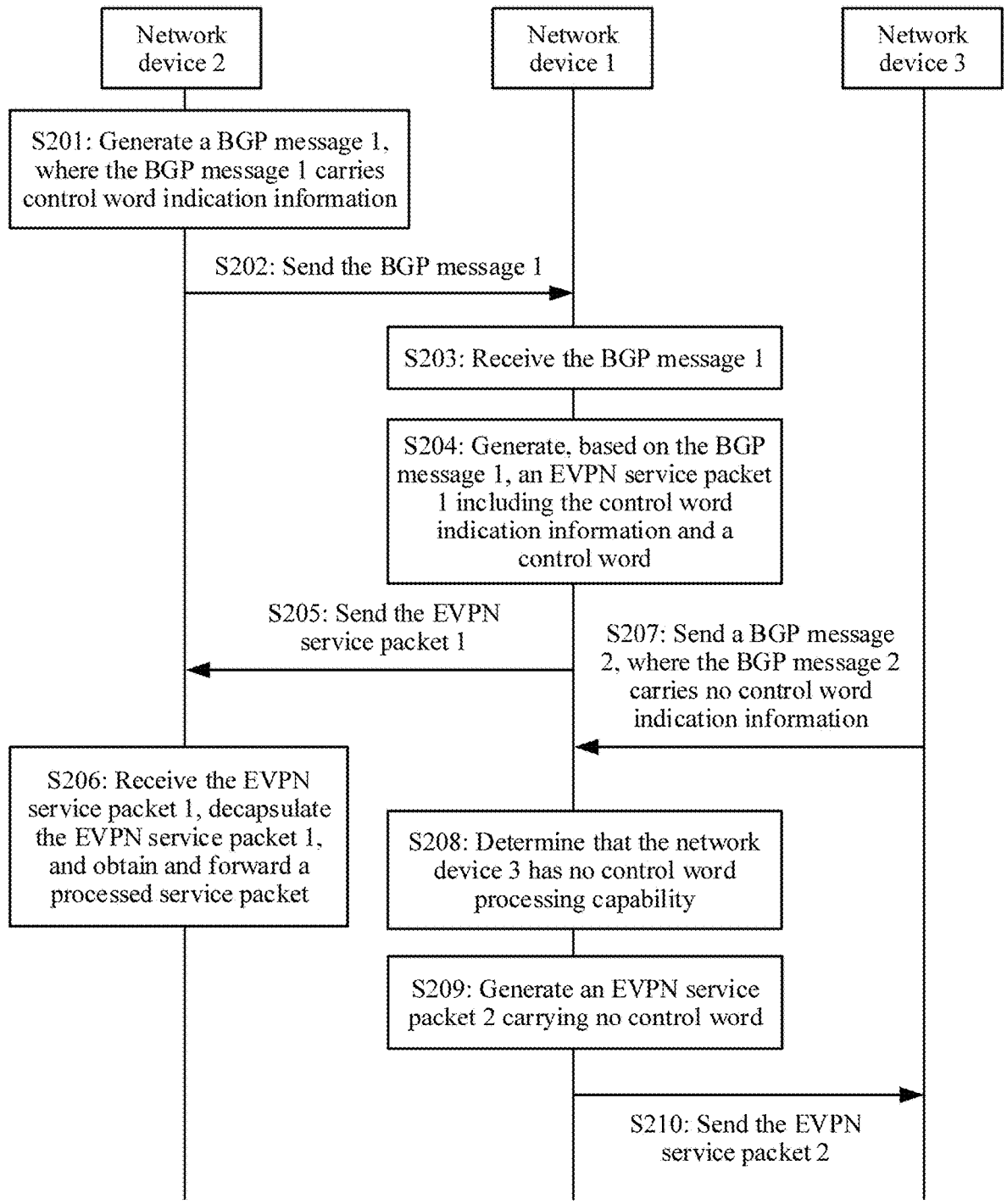
FIG. 2 is a schematic flowchart of a communication method according to an embodiment of this application.

The following describes in detail a communication method 200 according to an embodiment of this application with reference to FIG. 2. A network architecture to which the method 200 is applied includes a network device 1, a network device 2, and a network device 3. The network device 1 and the network device 2 are a pair of BGP peers, the network device 2 and the network device 3 are a pair of BGP peers, and the network device 1 and the network device 3 are a pair of BGP peers. The network device 1, the network device 2, and the network device 3 may be all PE devices. For example, the network device 1 may be the PE 1 shown in FIG. 1, the network device 2 may be the PE 2 shown in FIG. 1, and the network device 3 may be the PE 3 shown in FIG. 1. The network device 1 and the network device 2 each may be, for example, a device having a control word processing capability, and the network device 3 may be, for example, a device having no control word processing capability. The network architecture may be the network architecture shown in FIG. 1. The method 200 includes the following operations.

S201. The network device 2 generates a BGP message 1, where the BGP message 1 includes control word indication information.

The control word indication information is used to indicate that the network device 2 has a control word processing capability. The control word indication information is used to indicate the network device 1 to use an EVPN packet to carry a control word when the network device 1 sends the EVPN packet to the network device 2.

S202. The network device 2 sends the BGP message 1 to the network device 1.

The foregoing control word indication information is used to indicate that the network device 2 has the control word processing capability. After the network device 1 receives the BGP message 1 sent by the network device 2, if the network device 1 is a device having a control word processing capability, the network device 1 encapsulates the control word indication information and a control word in an EVPN service packet when sending the EVPN service packet to the network device 2. When receiving the EVPN packet sent by the network device 1, the network device 2 determines, based on the control word indication information carried in the packet, that the EVPN service packet carries the control word, and then parses the received packet based on a format of an EVPN packet carrying a control word. When the network device 1 is a device having no control word processing capability, no control word is carried when the network device 1 sends an EVPN packet to the network device 2. When receiving the EVPN service packet sent by the network device 1, the network device 2 finds, by parsing an MPLS header, that the EVPN packet carries no control word indication information, and therefore may determine that the EVPN packet carries no control word. In this case, the network device 2 parses the received EVPN packet based on a format of a packet carrying no control word. In examples of this description, the network device 2 advertises the control word processing capability to a BGP peer of the network device 2. Then, when receiving an EVPN service packet, the network device 2 determines, based on whether the packet carries the control word indication information, whether the packet carries a control word, and parses the packet based on a determining result and a correct format. In this way, even if a network device having a control word processing capability communicates with a network device having no control word processing capability, normal receiving and sending of traffic can still be ensured. This effectively ensures traffic transmission reliability.

In a specific implementation, in this application, the BGP message carries a next-hop capabilities attribute to carry the control word indication information. The next-hop capabilities attribute may also be referred to as a BGP next-hop dependent capabilities attribute, a BGP next-hop capabilities attribute, a next-hop attribute, or a BGP next-hop attribute. For related descriptions of the next-hop capabilities attribute, refer to draft-ietf-idr-next-hop-capability-03. This draft is incorporated in this application by reference in its entirety. The next-hop capabilities attribute, the BGP next-hop dependent capabilities attribute, and the BGP next-hop capabilities attribute mentioned in this draft are different names, which may represent a same attribute in essence, and are collectively referred to as the next-hop capabilities attribute in the following description. In this application, the control word indication information may be carried by extending a new sub type-length-value (TLV) field in the next-hop capabilities attribute. A value of a type field may be applied for from a standard organization based on a function of a control word, and the type field may occupy 1 byte. A length field indicates a length of a value field. The length field may occupy 1 byte. The value field is used to carry the control word indication information, and the value field may occupy 3 bytes.

In another specific implementation, this embodiment of this application provides a new BGP extended community attribute, which may be referred to as a control word extended community attribute, a control word attribute, or a control word extended attribute. These attributes are collectively referred to as the control word extended community attribute in the following description. A format of the control word extended community attribute is shown in FIG. 3. A type field indicates that the BGP extended community attribute is used to carry the control word indication information. A value of the type field may be applied for from a standard organization based on a function of a control word, and the type field may occupy 1 byte. A length field indicates a length of a value field. The length field may occupy 1 byte. The value field is used to carry the control word indication information, and the value field may occupy 3 bytes. In this application, a control word capability of a local network device can be advertised to a remote network device by providing the new BGP extended community attribute, so that the remote network device determines, based on the control word capability of the local network device, whether a control word needs to be carried when traffic is forwarded. In addition, the local network device can automatically identify, based on whether a data packet carries control word indication information sent to the peer device in advance, whether the traffic carries a control word.

In a specific implementation, the control word indication information may be allocated in the following three manners.

Manner 1. Using a reserved MPLS label.

A reserved label is applied for from the Internet assigned numbers authority (IANA), to indicate the control word indication information. For example, one of unassigned special-purpose MPLS label values of 15 MPLS labels reserved by the IANA is selected as the control word indication information. In this case, control word indication information carried by all PEs is the globally unique reserved label.

Manner 2. Global allocation.

To be specific, each network device applies for globally unique control word indication information. After the network device enables a control word processing capability, the control word indication information is carried in a BGP message and advertised to a neighboring device.

Manner 3. Per-instance allocation.

An EVPN is a VPN. A plurality of EVIs may coexist on each network device. Each EVI exists independently, and each EVI is connected to one or more groups of user networks, to form one or more cross-region layer 2 VPNs. When a plurality of EVIs exist on each network device, one piece of control word indication information may be allocated to each EVI, and different pieces of control word indication information are allocated to different EVIs.

In this application, if a control word processing capability is enabled, it is considered that the control word processing capability is available in both a receive direction and a transmit direction.

Figure 4A:
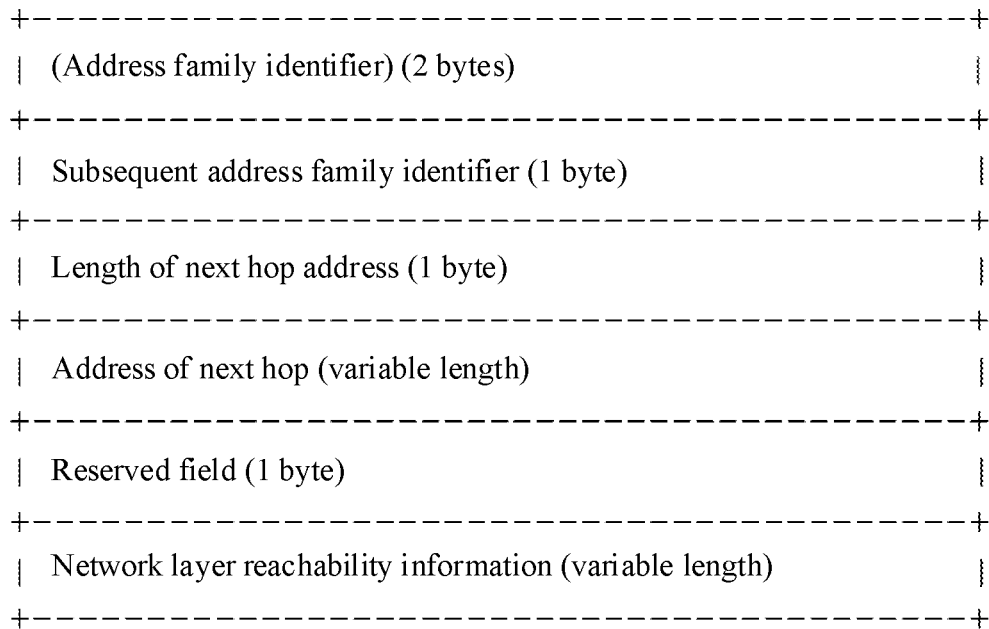
FIG. 4A is a schematic diagram of a format of a multi-protocol reachable network layer reachability information (MP_REACH_NLRI) attribute according to an embodiment of this application.
Figure 4B:
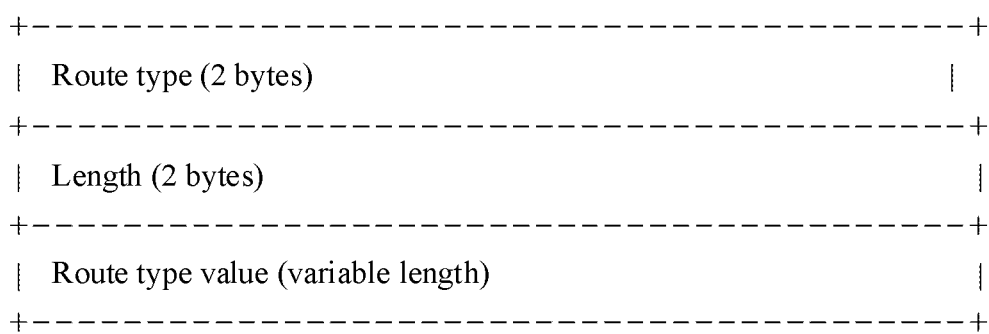
FIG. 4B is a schematic diagram of a format of an EVPN network layer reachability information (NLRI) field according to an embodiment of this application.

The BGP message 1 may be, for example, a BGP update message. The BGP update message may further include EVPN routing information, and the EVPN routing information is carried in EVPN NLRI. The EVPN NLRI is BGP NLRI defined in the BGP protocol and is used to advertise a BGP EVPN route. A BGP EVPN route advertised by the network device 1 to the network device 2 includes the EVPN NLRI. The BGP EVPN route includes but is not limited to a MAC/IP advertisement route, an Ethernet auto-discovery route (Ethernet A-D route), an inclusive multicast Ethernet tag route (IMET route), and an ES route. The EVPN NLRI is carried in an MP_REACH_NLRI attribute. The MP_REACH_NLRI attribute is an attribute defined in the BGP update message, and a specific format is shown in FIG. 4A. The attribute includes an address family identifier (AFI) field and a subsequent AFI (SAFI) field. A value of the AFI field is used to indicate a layer 2 VPN (L2VPN), and is, for example, 25. A value of the SAFI field is used to indicate an EVPN, and is, for example, 70. The MP_REACH_NLRI attribute further includes a "length of next hop network address" field and a "network address of next hop" field. The "network address of next hop" field is used to carry a network address of a next hop, and the network address of the next hop is a network address of the network device 1, for example, a loopback address of the network device 1. The loopback address may be an IP address configured on a loopback interface of the network device (for example, a router or a switch), and is usually used as a network device identifier (for example, a 32-bit-mask IP version 4 (IPv4) address: 10.10.1.1/32). This can be understood by a person skilled in the art. The MP_REACH_NLRI attribute further includes an NLRI field, and the EVPN in the L2VPN is indicated with reference to the values of the AFI field and the SAFI field. The NLRI field is an EVPN NLRI field. As shown in FIG. 4B, the EVPN NLRI field includes, for example, a 2-byte route type field, a 2-byte length field, and a route type specific field with a variable length. It should be noted that lengths of the route type field and the length field are not specifically limited in this application. The route type field is used to indicate different BGP EVPN route types.

The following uses the MAC/IP advertisement route as an example to describe the EVPN NLRI field. In this application, the EVPN NLRI and the EVPN NLRI field have a same meaning. The MAC/IP advertisement route includes a MAC advertisement route and an IP advertisement route, which are respectively used to guide layer 2 packet forwarding and layer 3 packet forwarding.

Figure 4C:
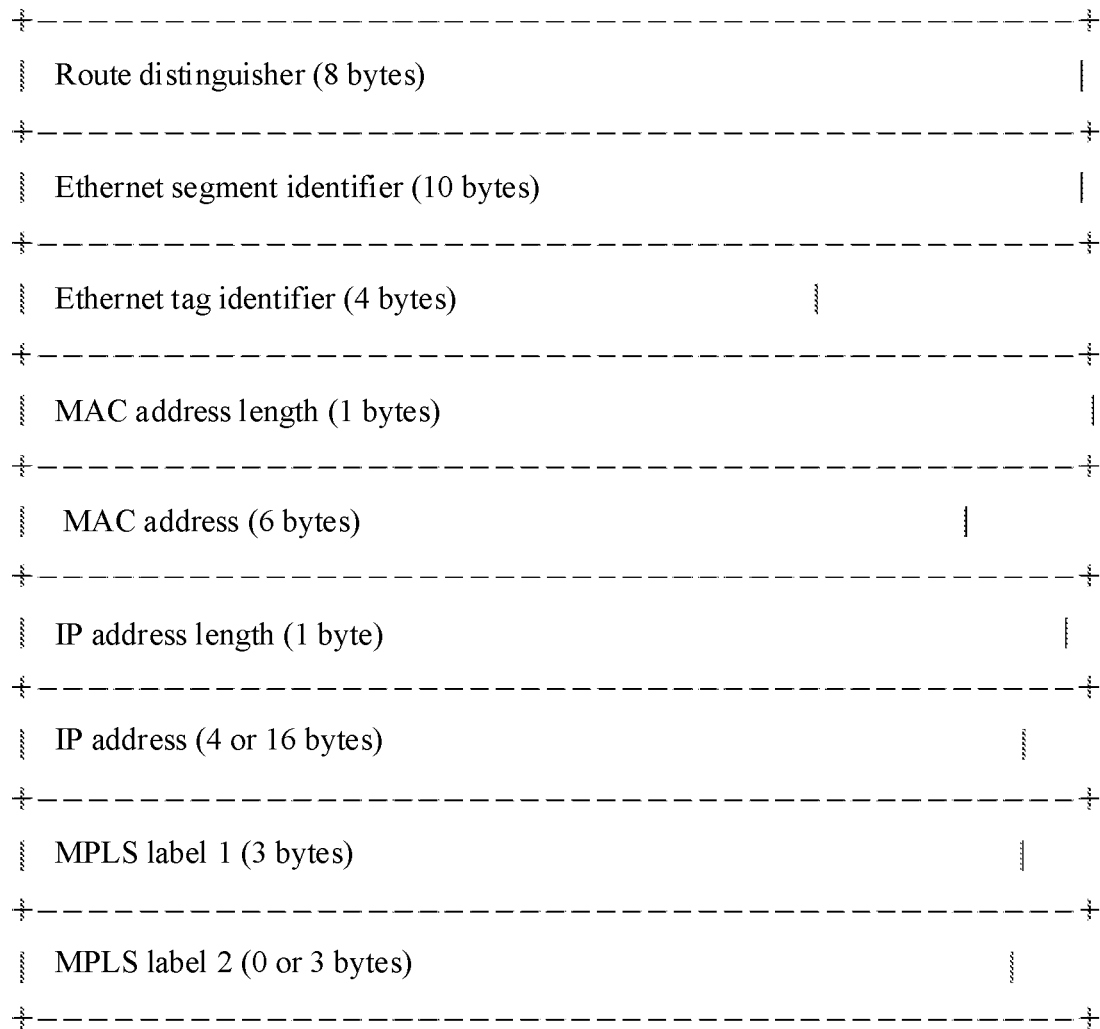
FIG. 4C is a schematic diagram of a format of a media access control (MAC)/Internet Protocol (IP) advertisement route according to an embodiment of this application.

For the MAC/IP advertisement route, the value of the route type field is 2, and the route type specific field is used to record details of the MAC/IP advertisement route. As shown in FIG. 4C, the MAC/IP advertisement route includes an 8-byte route distinguisher (RD) field, a 10-byte ESI field, a 4-byte Ethernet tag identifier (Ethernet Tag ID) field, a 1-byte MAC address length field, a 6-byte MAC address field, a 1-byte IP address length field, a 4-byte or 16-byte IP address field, a 3-byte MPLS label 1 field, and a 0-byte or 3-byte MPLS label 2 field. The MPLS label 1 field is used to carry a VPN label (which is also referred to as a private network label), which is used as an inner label during transmission in an MPLS network. On a forwarding plane, a PE sends a received data packet to a corresponding MAC forwarding table based on the VPN label, to send the data packet to a corresponding CE. The MPLS label 2 field is used to guide layer 3 traffic forwarding. In the MAC advertisement route, a value of the MPLS label 2 field is 0. A MAC address included in the MAC advertisement route is a MAC address of a CE device connected to the network device 1 or a MAC address of UE managed by the CE device. In this application, the MAC advertisement route is also briefly referred to as a MAC route.

For definitions of the BGP update message and the MP_REACH_NLRI attribute, refer to descriptions in the RFC 4760. For a definition of the EVPN NLRI field, refer to descriptions in the RFC 7432. Details are not described herein.

With reference to the scenario shown in FIG. 1, the following uses an example to describe a process in which a PE device advertises a BGP EVPN route.

A PE 2 learns of a MAC address, for example, MAC2, of UE 2 in a site 2. The PE 2 advertises a MAC route to a PE 1 through a BGP update message. A PE 3 does not learn of the MAC address of the UE 2 in the site 2. The PE 3 advertises an Ethernet A-D route to the PE 1. Therefore, the PE 1 learns, in an aliasing manner, that the PE 1 can reach the UE 2 through the PE 3. In this way, when unicast traffic sent by UE 1 to the UE 2 is transmitted through the PE 1, the PE 1 may perform load balancing on the unicast traffic. The unicast traffic is forwarded to a CE 2 through the PE 2 and the PE 3. In this way, the UE 1 and the UE 2 can communicate with each other in an EVPN 1.

In addition to the foregoing MAC route and Ethernet A-D route, in an EVPN network, a PE device needs to send, to another PE in a same EVI, broadcast, unknown-unicast, and multicast (BUM) traffic from a CE device. In this scenario, the PE that receives the BUM traffic needs to flood unknown unicast traffic to another PE device. Therefore, in the EVPN, after PE devices are deployed, each PE device needs to advertise an IMET route to another PE device to guide BUM packet forwarding. Under the guidance of the IMET route, a PE device that receives the IMET route forwards BUM traffic to a transmit end PE.

In a point-to-point (P2P) EVPN service, for example, if a P2P EVPN is deployed between the PE 1 and the PE 2, after learning of the MAC address of the UE 2 in the site 2, the PE 2 advertises a per-auto-discovery (AD)-EVI route to the PE 1 through a BGP update message. The per-AD-EVI route is an Ethernet A-D route. In a P2P scenario, all packets are broadcast. The per-AD-EVI route is used to guide packet forwarding in the P2P scenario.

For details about the BGP EVPN route, the MAC advertisement route, the Ethernet A-D route, and the IMET route, and details about how a PE device implements aliasing-based load balancing, refer to the RFC 7432. Related content in this document is incorporated in this specification by reference. For brevity, details are not described herein.

In a specific implementation, in this application, when the network device 1 receives the BGP message, and the BGP message carries the next-hop capabilities attribute or the extended community attribute of the control word indication information, a processing rule of the network device 1 is as follows.

1. The network device 1 enables a control word processing capability, and supports next-hop capabilities attribute parsing or control word extended community attribute parsing. After receiving the BGP message that is sent by the network device 2 and that carries the next-hop capabilities attribute or the control word extended community attribute, the network device 1 can correctly parse the next-hop capabilities attribute or the control word extended community attribute. The network device 1 locally stores the control word indication information and the EVPN routing information that are carried in the BGP message, and generates a MAC forwarding entry that includes the control word indication information. The network device 1 sends, to the network device 2 based on the MAC forwarding entry, a data packet that carries the control word indication information and a control word.

2. The network device 1 configures or enables no control word processing capability. After receiving the BGP message that is sent by the network device 2 and that carries the control word indication information, the network device 1 cannot correctly identify the next-hop capabilities attribute or the control word extended community attribute carried in the BGP message when parsing the next-hop capabilities attribute or the control word extended community attribute. In this case, the network device 1 may directly ignore the attribute, and parse the BGP message according to an existing procedure.

In this application, after the network device 1 receives a BGP message that carries no next-hop capabilities attribute or control word extended community attribute, that is, carries no control word indication information, a processing rule is as follows.

1. The network device 1 enables a control word processing capability, and supports next-hop capabilities attribute parsing or control word extended community attribute parsing. After receiving the BGP message that is sent by the network device 3 and that carries no next-hop capabilities attribute or control word extended community attribute, the network device 1 determines, based on the BGP message, that the network device 3 has no control word processing capability. When the network device 1 sends a data packet to the network device 3, no control word is carried.

2. The network device 1 configures or enables no control word processing capability. After receiving the BGP message that is sent by the network device 3 and that carries no next-hop capabilities attribute or control word extended community attribute, the network device 1 parses the BGP message according to an existing procedure.

S203. The network device 1 receives the BGP message 1.

S204. The network device 1 generates an EVPN service packet 1 based on the BGP message 1.

In a specific implementation, the network device 1 is a network device having a control word processing capability. The BGP message 1 includes the EVPN routing information and the control word indication information. After receiving the BGP message 1, the network device 1 stores the EVPN routing information and the control word indication information, and generates a forwarding entry based on the EVPN routing information and the control word indication information. The network device 1 generates the EVPN service packet 1 based on the forwarding entry, and the EVPN service packet 1 includes the control word indication information and a control word. An MPLS header of the EVPN service packet 1 includes an outer tunnel label, an inner private network label, and the control word indication information. The control word indication information may be encapsulated between the tunnel label and the private network label, or may be used as a bottom-of-stack label.

A control plane (for example, a control board) of the network device 1 generates different BGP EVPN routing entries and corresponding forwarding entries based on different types of BGP EVPN routes carried in the BGP message 1. For example, when the BGP EVPN route advertised through the BGP message is a MAC route, the network device 1 generates a MAC routing entry based on the BGP message, generates a corresponding MAC forwarding entry based on the MAC routing entry, and sends the MAC forwarding entry to a forwarding plane. When the BGP EVPN route advertised through the BGP message is an Ethernet A-D route, the network device 1 generates an Ethernet A-D routing entry based on the BGP message, generates a corresponding Ethernet A-D forwarding entry based on the Ethernet A-D routing entry, and sends the Ethernet A-D forwarding entry to a forwarding plane. When the BGP EVPN route advertised through the BGP message is an IMET route, the network device 1 generates an IMET routing entry based on the BGP message, generates a corresponding IMET forwarding entry based on the IMET routing entry, and sends the IMET forwarding entry to a forwarding plane. In the network device 1, different types of routing entries and forwarding entries are separately maintained and isolated from each other. The following uses the MAC route as an example to describe a process of generating a MAC routing entry and a MAC forwarding entry in this application. For each of the IMET route and the Ethernet A-D route, a process in which the network device generates a corresponding routing entry and a corresponding forwarding entry is similar to that for the MAC route, and details are not described in this application.

The network device 1 receives the BGP message 1 sent by the network device 2, and generates the MAC routing entry and the MAC forwarding entry based on MAC routing information carried in the BGP message 1. In a specific implementation, the control word indication information carried in the control word extended community attribute may be configured in the MAC routing entry (as shown in Table 1). A destination MAC address in the MAC routing entry is a MAC address (for example, MAC2) included in the MAC route. A network address of a next hop is a loopback address of the network device 2. The control word indication information is a label carried in a value field of the control word extended community attribute, for example, may be 2341. A private network label is an MPLS label, such as "LabelA", applied for when the network device 2 sends the BGP EVPN route to the network device 1. An encapsulation format of the control word indication information in the EVPN service packet is the same as that in conventional MPLS encapsulation. For example, the control word indication information includes 4 bytes. When a PE device forwards the data packet, the control word indication information is encapsulated in an MPLS header as an MPLS label. The network device 1 generates the MAC forwarding entry based on the MAC routing entry (as shown in Table 2), and sends the MAC forwarding entry to the forwarding plane (for example, a forwarding board) of the network device 1. When generating the MAC forwarding entry based on the MAC routing entry, the network device 1 may determine a destination MAC address and an outbound interface in the MAC forwarding entry based on the MAC routing entry. The destination MAC address in the MAC forwarding entry is the destination MAC address in the MAC routing entry. The outbound interface in the MAC forwarding entry is, for example, Intf1. That the network device 1 determines Intf1 as the outbound interface in the MAC forwarding entry may include the network device 1 first uses the loopback address of the network device 2 in the MAC routing entry as a search keyword to search a table of mapping from a forwarding equivalence class (FEC) to a next hop label forwarding entry (NHLFE) (where the table is also briefly referred to as an FEC to NHLFE (FTN) mapping table or an FTN forwarding table), to learn that an outbound interface corresponding to the loopback address of the network device 2 is a tunnel identifier (Tunnel ID) of a tunnel from the network device 1 to the network device 2. Then, the network device 1 searches a tunnel forwarding table by using the tunnel ID, to learn that an outbound interface corresponding to the tunnel ID is Intf1 (that is, an interface, on the network device 1, of the tunnel from the network device 1 to the network device 2). The network device 1 determines Intf1 as the outbound interface in the MAC forwarding entry. It should be noted that the tunnel may be a label switched path (LSP) tunnel, a resource reservation protocol-traffic engineering (RSVP-TE) tunnel, or the like. The tunnel is used to carry a known unicast data flow. For brevity, this is not shown in the accompanying drawings of the embodiments of the present disclosure.

TABLE 1

MAC routing entry

| Destination MAC | Network address of a next hop | Control word indication information | Private network label | |
|---|---|---|---|---|
| MAC2 | Loopback address of a network device 2 | 2341 | LabelA | ... |

TABLE 2

MAC forwarding entry

| Destination MAC | Outbound interface | Control word indication information | Private network label | |
|---|---|---|---|---|
| MAC2 | Intf1 | 2341 | LabelA | ... |

Table 1 and Table 2 list only some information in the MAC routing entry and the MAC forwarding entry, and other information is not shown for brevity. This can be understood by a person skilled in the art.

When the network device 1 receives known unicast traffic, for example, a destination MAC address carried in a packet is the MAC address (MAC2) included in the MAC route, the network device 1 queries the MAC forwarding table, to learn of information about the outbound interface for forwarding, and learn that the control word indication information and the control word need to be carried when the traffic is forwarded to the MAC2. Therefore, the network device 1 encapsulates the outer tunnel label, the inner private network label, and the control word indication information in the MPLS header, to indicate that the EVPN service packet further carries the control word.

S205. The network device 1 sends the EVPN service packet 1 to the network device 2.

S206. The network device 2 receives the EVPN service packet 1 sent by the network device 1.

After receiving the EVPN service packet 1, the network device 2 decapsulates the EVPN service packet 1 to obtain a processed data packet, and forwards the processed data packet. Specifically, the network device 2 determines, based on the control word indication information carried in the EVPN service packet 1, that the EVPN service packet 1 carries the control word. Therefore, after removing an MPLS label stack of the EVPN service packet 1, the network device 2 further removes the control word to obtain the processed data packet, and forwards the processed data packet to a destination of the EVPN service packet 1 based on a local MAC forwarding entry.

S207. The network device 1 receives a BGP message 2 sent by the network device 3.

S208. The network device 1 determines, based on the BGP message 2, that the network device 3 has no control word processing capability.

Specifically, the network device 3 is a network device having no control word processing capability, and the BGP message 2 carries no next-hop capabilities attribute or control word extended community attribute, that is, carries no control word indication information. The network device 1 is a network device having a control word processing capability, and the network device 1 determines that the BGP message 2 carries no control word extended community attribute, and therefore may determine, based on the BGP message 2, that the network device 3 is a network device having no control word processing capability.

S209. The network device 1 generates an EVPN service packet 2.

S210. The network device 1 sends the EVPN service packet 2 to the network device 3.

Based on the fact that the network device 1 determines that the network device 3 has no control word processing capability, the network device 1 generates the EVPN service packet 2 and sends the EVPN service packet 2 to the network device 3. The EVPN service packet 2 carries no control word. After receiving the EVPN service packet 2 sent by the network device 1, the network device 3 parses the packet based on a format of a packet carrying no control word.

In this application, network devices notify each other whether the network devices have a control word processing capability, so that when sending a data packet to a peer network device, a local network device can determine, based on whether the peer network device has a control word processing capability, whether to add a control word to the to-be-sent data packet. In this way, when receiving the data packet, the peer network device can correctly parse the packet. This effectively avoids a packet loss.

Figure 5:
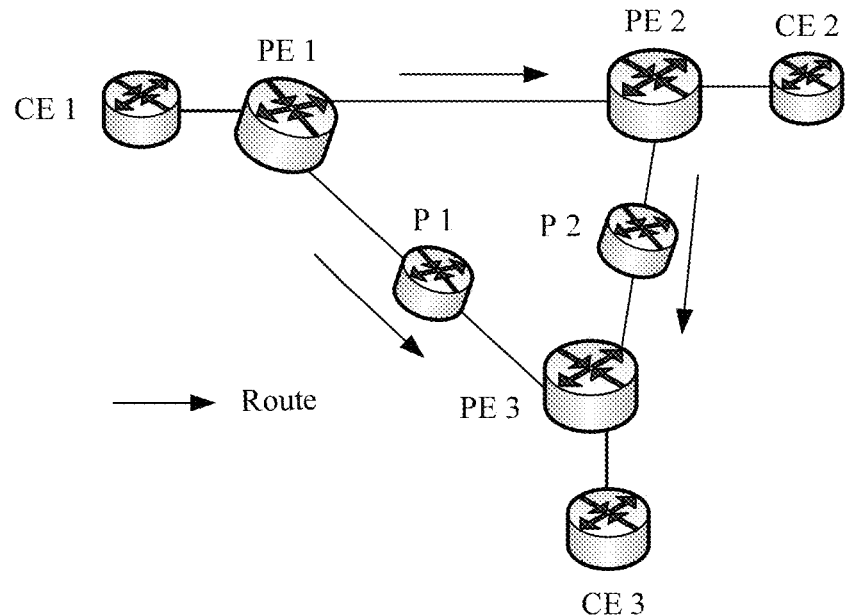
FIG. 5 is a schematic diagram of a network architecture in which an EVPN advertises a MAC route according to this application.
Figure 6:
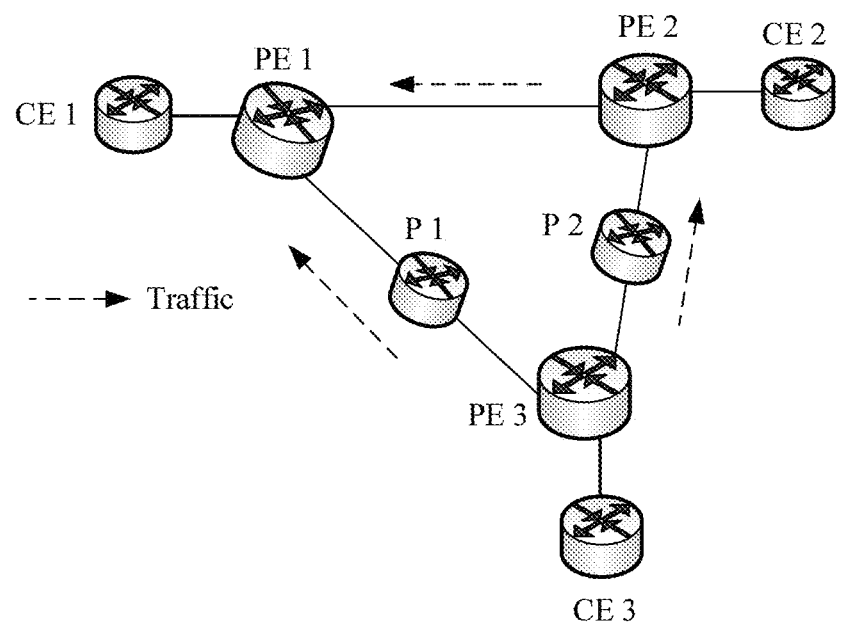
FIG. 6 is a schematic diagram of a network architecture in which an EVPN forwards MAC traffic according to this application.

With reference to schematic diagrams of network architectures shown in FIG. 5 and FIG. 6 and a specific application scenario, the following uses an example to describe application of a control word extended community attribute in a BGP EVPN route. It should be understood that the following scenario and specific application should not constitute a limitation on the technical solutions of this application. The following describes the technical solutions of this application by using an example in which a control word extended community attribute is applied to a MAC route to implement control word processing for unicast traffic in an EVPN MP2MP scenario.

With reference to FIG. 5, a PE 1 and a PE 3 each are a network device having a control word processing capability, and a PE 2 is a device having no control word processing capability. An information creation process on a control plane is as follows.

The PE 1 sends a MAC route whose source MAC is MAC1 to the PE 3 and applies for a private network label Label1. The MAC route carries control word indication information CLI1. After the PE 3 receives the MAC route advertised by the PE 1, when the PE 3 finds, through parsing, that the MAC route carries the control word indication information, and the PE 3 enables the control word processing capability, the PE 3 sends the control word indication information CLI1 carried in the MAC route to a forwarding plane along with the MAC1 and the private network label Label1, to generate a forwarding table.

The PE 1 sends a MAC route whose source MAC is MAC1 to the PE 2 and applies for a private network label Label1. The MAC route carries control word indication information CLI1. The PE 2 receives the MAC route that is advertised by the PE 1 and that carries the control word indication information. However, because no control word processing capability is deployed on the PE 3, the PE 3 cannot correctly parse the control word indication information, but only sends the MAC1 and the private network label Label1 to a forwarding table. Alternatively, although a control word processing capability is deployed on the PE 3, the PE 3 does not enable the control word processing capability. In this case, although the PE 3 can correctly parse the control word indication information, the PE 3 does not send the control word indication information to a forwarding table.

The PE 2 advertises a MAC route whose source MAC is MAC2 to the PE 3 and applies for a private network label Label2. Because the PE 2 has no control word processing capability, no control word indication information is carried when the PE 2 advertises the MAC route. After receiving the MAC route advertised by the PE 2, the PE 3 normally parses a BGP message in a manner in which no control word indication information is carried, extracts the MAC2 and the private network label Label2, and sends the MAC2 and the private network label Label2 to a forwarding plane to generate a forwarding entry.

A procedure in which the PE 3 advertises a MAC route to the PE 1 is the same as the procedure in which the PE 1 advertises the MAC route to the PE 3. Details are not described herein.

A procedure in which the PE 2 advertises a MAC route to the PE 1 is the same as the procedure in which the PE 2 advertises the MAC route to the PE 3. Details are not described herein.

With reference to FIG. 6, a traffic forwarding process on a forwarding plane is as follows.

When a CE 3 accesses a CE 1, a PE 3 receives a data packet (Payload1 (MAC1)) sent by the CE 3 for accessing MAC1, queries a forwarding entry based on the destination MAC address MAC1, encapsulates the data packet into "tunnel label+private network label+control word indication information+control word+data packet payload (Payload1 (MAC1))", and forwards the encapsulated data packet to a PE 1 through a P 1. After receiving the data packet sent by the PE 3, the P 1 forwards the data packet according to a normal forwarding procedure. For the device P 1, the control word indication information is an inner label in an MPLS label stack, and is not changed on the forwarding plane. After re-encapsulating the received data packet, the P 1 sends a re-encapsulated data packet to the PE 1. After receiving the data packet sent by the P 1, the PE 1 parses the MPLS label stack, removes the tunnel label, the private network label, and the control word indication information, and determines, based on the control word indication information carried in the data packet, that the data packet carries a control word. The PE 1 obtains a processed data packet after removing the control word, and forwards the processed data packet to the CE 1 based on a local MAC forwarding entry.

When the CE 3 accesses a CE 2, the PE 3 receives a data packet (Payload2 (MAC2)) sent by the CE 3 for accessing MAC2, queries the forwarding entry based on the destination MAC address MAC2, encapsulates the data packet into "tunnel label+private network label+data packet payload (Payload2 (MAC2))", and sends the encapsulated data packet to a PE 2. After receiving the data packet sent by the PE 3, and removing the tunnel label and the private network label, the PE 2 obtains a processed data packet, and sends the processed data packet to the CE 2 based on a local MAC forwarding entry.

When the CE 2 accesses the CE 1, the PE 2 receives a data packet (Payload3 (MAC1)) sent by the CE 2 for accessing MAC1, queries a forwarding entry based on the destination MAC address MAC1, encapsulates the data packet into "tunnel label+private network label+data packet payload (Payload3 (MAC1))", and forwards the encapsulated data packet to the PE 1 through a P 2. After receiving the data packet that carries no control word, the P 2 sends the data packet to the PE 1 according to a normal forwarding procedure. After receiving the data packet sent by the PE 2, and removing the tunnel label and the private network label, the PE 1 obtains a processed data packet, and sends the processed data packet to the CE 1 based on a local MAC forwarding entry.

In examples of this description, control word indication information may be carried in a MAC route, to process a control word in unicast traffic. Certainly, a person skilled in the art may understand that control word indication information may alternatively be carried in both a MAC route and an Ethernet A-D route, to process a control word in a scenario in which aliasing-based load balancing is performed on unicast traffic. A processing procedure thereof is similar to a procedure of processing a control word in unicast MAC traffic. This can be understood by a person skilled in the art. Details are not described herein. In addition, the control word indication information may be carried in an IMET route, to process a control word in BUM traffic. A procedure in which the control word indication information is carried when the IMET route is advertised is similar to the procedure in which the MAC route is advertised. Details are not described again. After receiving the IMET route that carries the control word indication information, a BGP peer of a peer end determines, based on a control word processing capability of the BGP peer, whether to store the control word indication information together with IMET routing information in an IMET routing entry, and then generate an IMET forwarding entry to guide packet forwarding. These procedures can be understood by a person skilled in the art, and details are not described herein.

In this application, a local device dynamically advertises a control word processing capability of the local device to a remote device, to simplify operations, so that in an EVPN, a network device that supports or enables no control word processing capability can be compatible with. Specifically, a BGP control word extended community attribute or a next-hop capabilities attribute may be newly added to advertise the control word processing capability of the local end to the peer device. If the remote device has a control word processing capability, in other words, the control word processing capability is deployed on the remote device and the remote device enables the control word processing capability, when sending a data packet to the local device, the remote device uses the data packet to carry a control word and control word indication information that is advertised by the local device in advance. In this way, the local device can correctly identify, based on the control word indication information, that the data packet carries the control word, and can correctly parse the data packet based on a format of a packet carrying a control word. If no control word processing capability is deployed on the remote device or the remote device enables no control word processing capability, neither a control word nor control word indication information is carried when the remote device sends a data packet to the local device. In this way, the local device determines, based on the fact that the data packet does not carry control word indication information advertised to the peer device in advance, that the received data packet carries no control word, and then parses the data packet based on a format of a packet carrying no control word. This can also ensure that the packet is correctly parsed.

Figure 7:
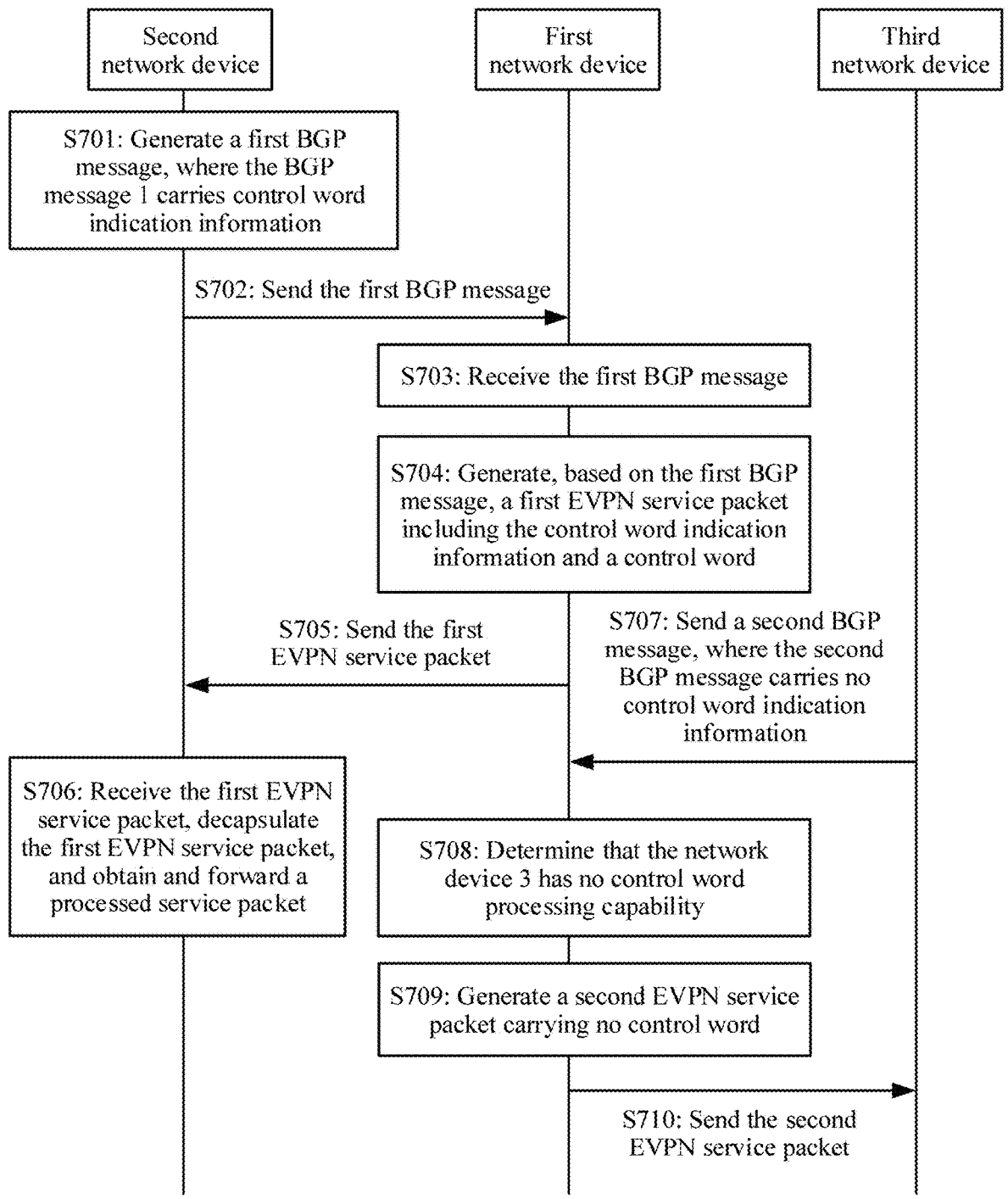
FIG. 7 is a schematic flowchart of another communication method according to an embodiment of this application.

FIG. 7 is a schematic flowchart of a communication method 700 according to an embodiment of this application. A network architecture to which the method 700 is applied includes at least a first network device and a second network device, and the network architecture may further include a third network device. The first network device and the second network device are BGP peers, the second network device and the third network device are BGP peers, and the first network device and the third network device are BGP peers. The first network device, the second network device, and the third network device each may be a PE device. For example, the first network device may be the PE 1 shown in FIG. 1, the second network device may be the PE 2 shown in FIG. 1, and the third network device may be the PE 3 shown in FIG. 1. The network architecture may be the network architecture shown in FIG. 1. In addition, the method shown in FIG. 7 may be used to specifically implement the method shown in FIG. 2. For example, the first network device, the second network device, and the third network device in FIG. 7 may be respectively the network device 1, the network device 2, and the network device 3 in the method 200 shown in FIG. 2. The method shown in FIG. 7 includes the following content.

S701. The second network device generates a first BGP message, where the first BGP message includes control word indication information.

The control word indication information is used to indicate that the second network device has a control word processing capability. The control word indication information is used to indicate the first network device to use a first EVPN packet to carry a control word when the first network device sends the first EVPN packet to the second network device.

S702. The second network device sends the first BGP message to the first network device.

When the method shown in FIG. 7 is used to implement the method 200 shown in FIG. 2, the first BGP message may be, for example, the BGP message 1 in the method 200.

For details about how the first network device processes the first BGP message and how the first network device processes a subsequently received EVPN service packet based on the control word indication information after receiving the first BGP message sent by the second network device, related descriptions of a BGP extended community attribute or a next-hop capabilities attribute that carries the control word indication information, and a specific manner of allocating the control word indication information, refer to the related descriptions in the method 200. Details are not described herein again.

For details about how the second network device advertises a BGP EVPN route to the first network device, refer to the related descriptions in the method 200. Details are not described herein again.

S703. The first network device receives the first BGP message.

S704. The first network device generates the first EVPN service packet based on the first BGP message.

When the method shown in FIG. 7 is used to implement the method 200 shown in FIG. 2, the first EVPN service packet may be, for example, the EVPN service packet 1 in the method 200. For details about how the first network device generates the first EVPN service packet based on the first BGP message, refer to the related descriptions of generating the EVPN service packet 1 by the network device 1 based on the BGP message 1 in the method 200. Details are not described herein again.

S705. The first network device sends the first EVPN service packet to the second network device.

S706. The second network device receives the first EVPN service packet sent by the first network device.

After receiving the first EVPN service packet, the second network device decapsulates the first EVPN service packet to obtain a processed data packet, and forwards the processed data packet. Specifically, the second network device determines, based on the control word indication information carried in the first EVPN service packet, that the first EVPN service packet carries the control word. Therefore, after removing an MPLS label stack of the first EVPN service packet, the second network device further removes the control word to obtain the processed data packet, and forwards the processed data packet to a destination of the first EVPN service packet based on a local MAC forwarding entry.

S707. The first network device receives a second BGP message sent by the third network device.

When the method shown in FIG. 7 is used to implement the method 200 shown in FIG. 2, the third network device may be, for example, the network device 3 in the method 200, and the second BGP message may be, for example, the BGP message 2 in the method 200.

S708. The first network device determines, based on the second BGP message, that the third network device has no control word processing capability.

Specifically, the third network device is a network device having no control word processing capability, and the second BGP message carries no control word indication information, for example, carries no control word extended community attribute or next-hop capabilities attribute. The first network device is a network device having a control word processing capability, and the first network device determines that the second BGP message carries no control word indication information, and therefore may determine, based on the second BGP message, that the third network device is a network device having no control word processing capability.

S709. The first network device generates a second EVPN service packet.

When the method shown in FIG. 7 is used to implement the method 200 shown in FIG. 2, the second EVPN service packet may be, for example, the EVPN service packet 2 in the method 200.

S710. The first network device sends the second EVPN service packet to the third network device.

Based on the fact that the first network device determines that the third network device has no control word processing capability, the first network device generates the second EVPN service packet and sends the second EVPN service packet to the third network device. The second EVPN service packet carries no control word. After receiving the second EVPN service packet sent by the first network device, the third network device parses the packet based on a format of a packet with no control word.

In this application, network devices notify each other whether the network devices have a control word processing capability, so that when sending a data packet to a peer network device, a local network device can determine, based on whether the peer network device has a control word processing capability, whether to add a control word to the to-be-sent data packet. In this way, when receiving the data packet, the peer network device can correctly parse the packet. This effectively avoids a packet loss.

Figure 8:
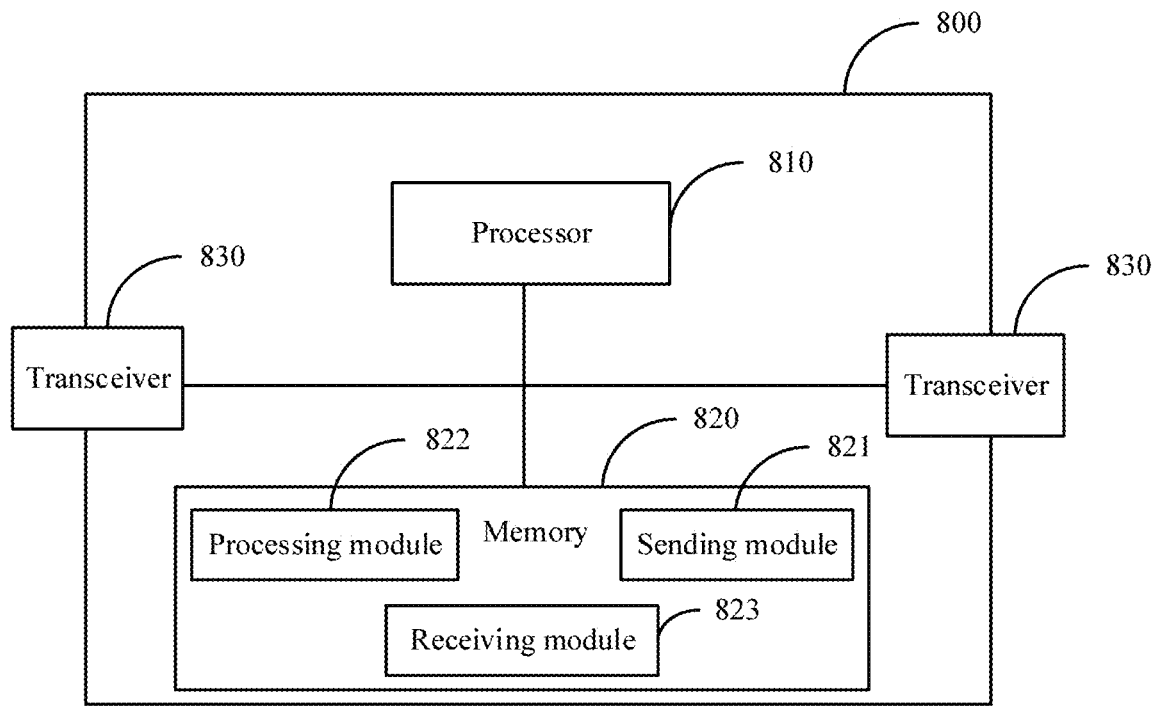
FIG. 8 is a schematic structural diagram of a first network device according to an embodiment of this application.

FIG. 8 is a schematic diagram of a network device 800 according to this application. The network device 800 may be applied to the network architecture shown in FIG. 1, and may be, for example, the PE 1 in the network architecture shown in FIG. 1. The network device 800 is configured to perform the operations performed by the network device 1 in the method 200 or the operations performed by the first network device in the method 700. As shown in FIG. 8, the network device 800 may include a processor 810, and a memory 820 and a transceiver 830 that are coupled to the processor 810. The processor 810 may be a central processing unit (CPU), a network processor (NP), or a combination of a CPU and an NP. Alternatively, the processor 810 may be an application-specific integrated circuit (ASIC), a programmable logic device (PLD), or a combination thereof. The PLD may be a complex PLD (CPLD), a field-programmable gate array (FPGA), generic array logic (GAL), or any combination thereof. The processor 810 may be one processor, or may include a plurality of processors. The memory 820 may be a volatile memory such as a random-access memory (RAM), or the memory may be a non-volatile memory such as a read-only memory (ROM), a flash memory, a hard disk drive (HDD), or a solid-state drive (SSD). Alternatively, the memory 820 may include a combination of the foregoing types of memories. The memory 820 may be one memory, or may include a plurality of memories. In an implementation, the memory 820 stores a computer-readable instruction, and the computer-readable instruction includes a plurality of software modules, for example, a sending module 821, a processing module 822, and a receiving module 823. After executing each software module, the processor 810 may perform a corresponding operation according to an indication of the software module. In this embodiment, an operation performed by a software module is actually an operation performed by the processor 810 according to an indication of the software module. For example, the receiving module 823 is configured to receive a BGP message from a second network device. The BGP message includes EVPN routing information and control word indication information, and the control word indication information is used to indicate the network device 800 to use a first EVPN service packet to carry a control word when the network device 800 sends the first EVPN service packet to the second network device. The processing module 822 is configured to generate the first EVPN service packet. The first EVPN service packet includes the control word indication information and the control word, and the control word indication information is used to indicate that the first EVPN service packet includes the control word. The sending module 821 is configured to send the first EVPN service packet to the second network device. In addition, after executing the computer-readable instruction in the memory 820, the processor 810 may perform, according to an indication of the computer-readable instruction, all operations that can be performed by the network device 1 or the first network device, for example, the operations performed by the network device 1 in the embodiments corresponding to FIG. 2 to FIG. 6, or the operations performed by the first network device in the embodiment corresponding to FIG. 7.

Figure 9:
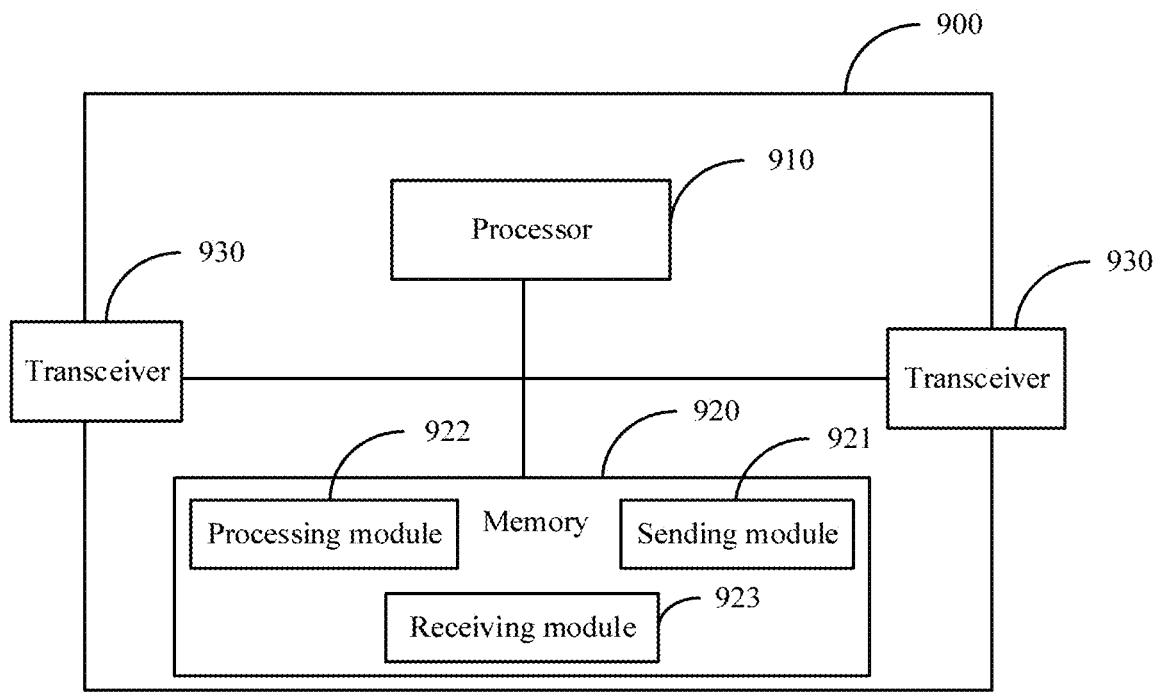
FIG. 9 is a schematic structural diagram of a second network device according to an embodiment of this application.

FIG. 9 is a schematic diagram of a network device 900 according to this application. The network device 900 may be applied to the network architecture shown in FIG. 1, and may be, for example, the PE 2 in the network architecture shown in FIG. 1. The network device 900 is configured to perform the operations performed by the network device 2 in the method 200 or the operations performed by the second network device in the method 700. As shown in FIG. 9, the network device 900 may include a processor 910, and a memory 920 and a transceiver 930 that are coupled to the processor 910. The processor 910 may be a CPU, an NP, or a combination of a CPU and an NP. The processor may further include a hardware chip. The hardware chip may be an ASIC, a PLD, or a combination thereof. The PLD may be a CPLD, an FPGA, GAL, or any combination thereof. The processor 910 may be one processor, or may include a plurality of processors. The memory 920 may be a volatile memory such as a RAM, or the memory may be a non-volatile memory such as a ROM, a flash memory, an HDD, or an SSD. Alternatively, the memory may include a combination of the foregoing types of memories. The memory 920 may be one memory, or may include a plurality of memories. In an implementation, the memory 920 stores a computer-readable instruction, and the computer-readable instruction may include a plurality of software modules, for example, a sending module 921, a processing module 922, and a receiving module 923. After executing each software module, the processor 910 may perform a corresponding operation according to an indication of the software module. In this embodiment, an operation performed by a software module is actually an operation performed by the processor 910 according to an indication of the software module. For example, the receiving module 923 is configured to receive a first EVPN service packet from a first network device. The first EVPN service packet includes control word indication information and a control word. The processing module 922 is configured to determine, based on the control word indication information, that the first EVPN service packet includes the control word, and obtain a processed EVPN service packet based on the first EVPN service packet. The processed EVPN service packet does not carry the control word indication information or the control word. The sending module 921 is configured to send the processed EVPN service packet to a destination of the first EVPN service packet. In addition, after executing the computer-readable instruction in the memory 920, the processor 910 may perform, according to an indication of the computer-readable instruction, all operations that can be performed by the network device 2 or the second network device, for example, the operations performed by the network device 2 in the embodiments corresponding to FIG. 2 to FIG. 6, or the operations performed by the second network device in the embodiment corresponding to FIG. 7.

An embodiment of this application further provides a communications system, including the network device 800 in the embodiment corresponding to FIG. 8 and the network device 900 in the embodiment corresponding to FIG. 9, and configured to perform the method 200 in the embodiment corresponding to FIG. 2 or the method 700 in the embodiment corresponding to FIG. 7.

A person of ordinary skill in the art may be aware that, in combination with the examples described in the embodiments disclosed in this specification, modules and method operations may be implemented by electronic hardware or a combination of computer software and electronic hardware.

Whether the functions are performed by hardware or software depends on particular applications and design constraint conditions of the technical solutions. A person skilled in the art may implement the described functions by using a different method for each specific application.

It may be clearly understood by a person skilled in the art that, for the purpose of convenient and brief description, for a detailed working process of the foregoing system, apparatus, and module, refer to a corresponding process in the foregoing method embodiments. Details are not described herein again.

All or some of the foregoing embodiments may be implemented through hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, an SSD), or the like.

All parts in this specification are described in a progressive manner. For same or similar parts in the embodiments, mutual reference may be made. Each embodiment focuses on a difference from other embodiments. Especially, apparatus and system embodiments are basically similar to a method embodiment, and therefore are described briefly. For related parts, refer to descriptions in the method embodiment.

The foregoing descriptions are certain implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A first network device, comprising:
   one or more processors; and
   a memory coupled to the one or more processors and configured to store instructions that, when executed by the one or more processors, cause the first network device to be configured to:
      receive a first border gateway protocol (BGP) message from a second network device, wherein the first BGP message comprises an extended community attribute indicating that the second network device has a control word processing capability;
      obtain a first Ethernet virtual private network (EVPN) service packet, wherein the first EVPN service packet comprises control word indication information and a control word, and wherein the control word indication information indicates that the first EVPN service packet comprises the control word; and
      send the first EVPN service packet to a second network device.

2. The first network device of claim 1, wherein the first BGP message comprises EVPN routing information.

3. The first network device of claim 2, wherein the instructions, when executed by the one or more processors, further cause the first network device to be configured to generate, based on the EVPN routing information, a forwarding entry comprising the control word indication information.

4. The first network device of claim 1, wherein the instructions, when executed by the one or more processors, further cause the first network device to be configured to receive a second BGP message from a third network device, wherein the second BGP message indicates that the third network device has no control word processing capability.

5. The first network device of claim 4, wherein the instructions, when executed by the one or more processors, further cause the first network device to be configured to:
   generate a second EVPN service packet without the control word; and
   send the second EVPN service packet to the third network device.

6. A second network device, comprising:
   one or more processors; and
   a memory coupled to the one or more processors and configured to store instructions that, when executed by the one or more processors, cause the second network device to be configured to:
      generate a border gateway protocol (BGP) message, wherein the BGP message comprises information indicating the second network device has control word processing capability, wherein the BGP message comprises an extended community attribute carrying the information; and
      send the BGP message to a first network device.

7. The second network device of claim 6, wherein the instructions, when executed by the one or more processors, further cause the second network device to be configured to receive an Ethernet virtual private network (EVPN) service packet from the first network device, wherein the EVPN service packet comprises control word indication information and the control word, and wherein the control word indication information indicates the EVPN service packet comprises the control word.

8. The second network device of claim 7, wherein the control word indication information is a reserved label.

9. The second network device of claim 7, wherein the instructions, when executed by the processor, further cause the second network device to be configured to allocate the control word indication information.

10. The second network device of claim 7, wherein the BGP message further comprises the control word indication information.

11. A communication system, comprising:
   a first network device comprising:
      one or more first processors; and
      a first memory coupled to the one or more first processors and configured to store first instructions that, when executed by the one or more first processors, cause the first network device to be configured to send a border gateway protocol (BGP) message, wherein the BGP message comprises an extended community attribute carrying information indicating the first network device has control word processing capability;

a second network device, comprising:
one or more second processors; and
a second memory coupled to the one or more second processors and configured to store second instructions that, when executed by the one or more second processors, cause the second network device to be configured to:
receive the BGP message from the first network device; and
send a first Ethernet virtual private network (EVPN) service packet, wherein the first EVPN service packet comprises control word indication information and a control word, and wherein the control word indication information indicates that the first EVPN service packet comprises the control word.

12. The communication system of claim 11, wherein the control word indication information is a reserved label.

13. The communication system of claim 11, wherein the BGP message further comprises the control word indication information.

14. The communication system of claim 11, wherein the first instructions, when executed by the one or more first processors, further cause the first network device to be configured to allocate the control word indication information.

* * * * *